US011838342B1

(12) United States Patent
Webb, II et al.

(10) Patent No.: US 11,838,342 B1
(45) Date of Patent: Dec. 5, 2023

(54) SYNERGISTIC QUEUE MANAGEMENT

(71) Applicant: Amazon Technologies, Inc., Seattle, WA (US)

(72) Inventors: David Lawrence Webb, II, Lynnwood, WA (US); Caleb Patrick Gross, Thornton, CO (US); Stephen Mardin, Seattle, WA (US); Tim Pritchard, Seattle, WA (US); Ramon Wilkinson, Blackburn South (AU)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/809,266

(22) Filed: Jun. 27, 2022

(51) Int. Cl.
*H04L 65/61* (2022.01)
*H04L 65/75* (2022.01)

(52) U.S. Cl.
CPC ............ *H04L 65/61* (2022.05); *H04L 65/762* (2022.05); *H04L 65/764* (2022.05)

(58) Field of Classification Search
CPC ...... H04L 65/61; H04L 65/762; H04L 65/764
See application file for complete search history.

(56) References Cited

U.S. PATENT DOCUMENTS

| | | | | |
|---|---|---|---|---|
| 7,024,381 B1 * | 4/2006 | Hastings | ................ | G06Q 30/06 725/60 |
| 7,865,522 B2 * | 1/2011 | Purdy | ................ | G06F 16/4387 707/790 |
| 9,824,144 B2 * | 11/2017 | Farrelly | ................... | G06N 5/04 |
| 10,390,068 B1 * | 8/2019 | Hardy | .................. | H04N 21/234 |
| 2002/0083443 A1 * | 6/2002 | Eldering | .......... | H04N 21/26233 348/E7.063 |
| 2002/0178445 A1 * | 11/2002 | Eldering | .......... | H04N 21/47202 705/14.69 |
| 2003/0101213 A1 * | 5/2003 | Wright | .................. | H04L 67/561 709/203 |
| 2003/0133145 A1 * | 7/2003 | Koppich | ............ | H04N 1/00294 358/1.15 |
| 2003/0182579 A1 * | 9/2003 | Leporini | ............ | H04N 21/8355 348/E7.063 |
| 2004/0158503 A1 * | 8/2004 | Gross | ..................... | G06Q 30/06 705/26.1 |
| 2008/0069115 A1 * | 3/2008 | Jensen | .................... | H04L 47/24 370/395.41 |
| 2008/0069128 A1 * | 3/2008 | Jensen | .................. | H04L 49/254 370/412 |
| 2008/0134043 A1 * | 6/2008 | Georgis | ................ | H04L 67/104 348/E7.071 |
| 2008/0256085 A1 * | 10/2008 | Lee | ..................... | H04N 21/4882 348/E7.071 |
| 2008/0276270 A1 * | 11/2008 | Kotaru | ............... | H04N 21/2668 725/34 |

(Continued)

*Primary Examiner* — Javier O Guzman
(74) *Attorney, Agent, or Firm* — Weaver Austin Villeneuve & Sampson LLP (57) ABSTRACT

Synergistic queue management techniques are disclosed. The techniques can include receiving, by a server, a first queue action message, the first queue action message indicating a first queue action for a content queue associated with a client device, determining, based on the first queue action, a second queue action for the content queue, the second queue action comprising a supplemental queue action for the first queue action, and sending a second queue action message to the client device, the second queue action message indicating the second queue action.

20 Claims, 9 Drawing Sheets

(56) References Cited

U.S. PATENT DOCUMENTS

| | | | |
|---|---|---|---|
| 2010/0131977 A1* | 5/2010 | San Jule | H04N 21/4438 725/37 |
| 2013/0073584 A1* | 3/2013 | Kuper | G06F 16/48 707/769 |
| 2015/0378796 A1* | 12/2015 | Word | G06F 9/542 709/203 |
| 2015/0381514 A1* | 12/2015 | Word | H04L 67/1029 709/203 |

* cited by examiner

SYNERGISTIC QUEUE MANAGEMENT

BACKGROUND

In order to provide content service to a large number of geographically dispersed service subscribers, a content service provider may implement a cloud-based content provision model. According to such a model, remotely-stored content items can be streamed to subscriber devices via a network, such as the Internet. Client applications executing at the subscriber devices can tailor aspects of the content provision (e.g., the types of content provided, the order in which various content items are provided, etc.) at those devices based on user input.

BRIEF DESCRIPTION OF THE DRAWINGS

Various aspects of the present disclosure will be described with reference to the drawings, in which.

DETAILED DESCRIPTION

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the implementations being described.

Figure 1:
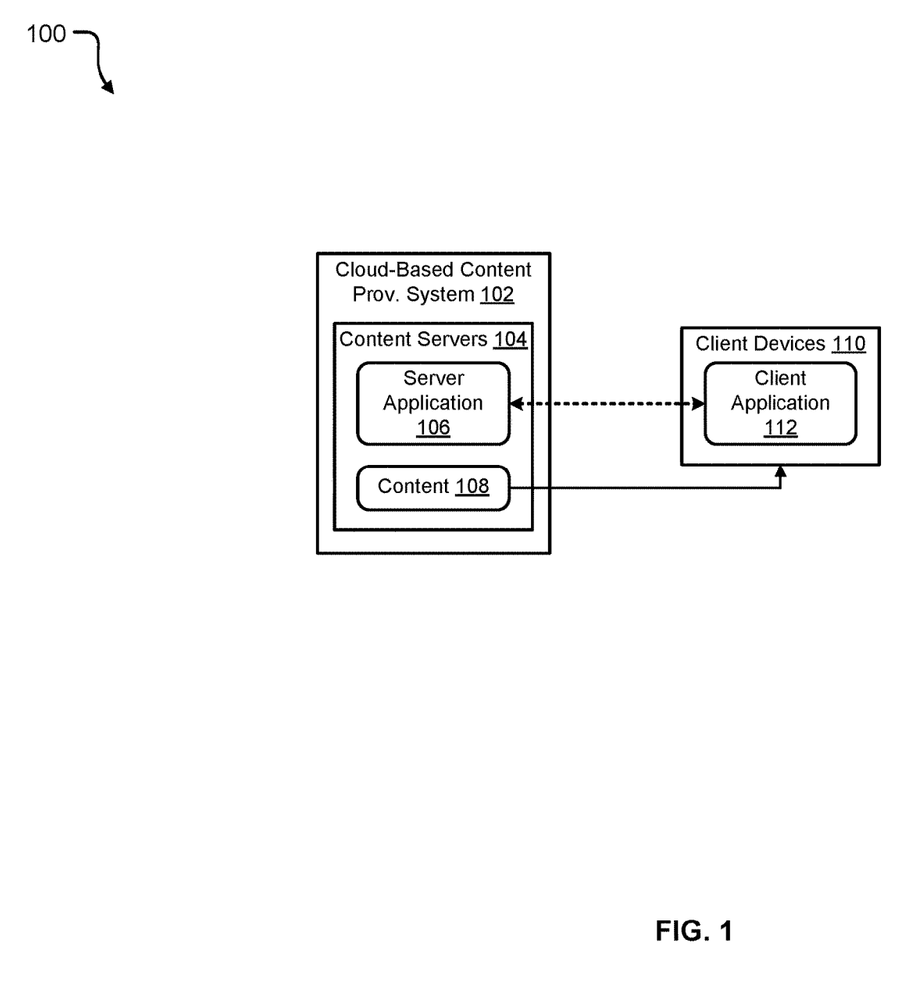
FIG. 1 is a block diagram illustrating a first example operating environment.

FIG. 1 illustrates an example operating environment 100 in which techniques for device/cloud-synergistic queue management may be implemented according aspects of the disclosure. In operating environment 100, using cloud-based content provision system 102, a content provider provides content services to a plurality of content service subscribers. Cloud-based content provision system 102 includes content servers 104. In conjunction with the provision of content services, content servers 104 execute server application 106 and deliver content 108 to client devices 110. Client devices 110 execute client application 112, which can communicate directly or indirectly with instances of server application 106 executing at content servers 104 to facilitate the delivery of content 108 to client devices 110. Content service subscribers can use client devices 110 to select and/or consume content 108 provided by the content provider. In some implementations, content 108 can comprise audio content, such as audio tracks (e.g., songs, podcasts, audio clips, etc.).

In some implementations, content 108 can alternately or additionally comprise video content or multimedia (e.g., audio-visual) content.

Figure 2:
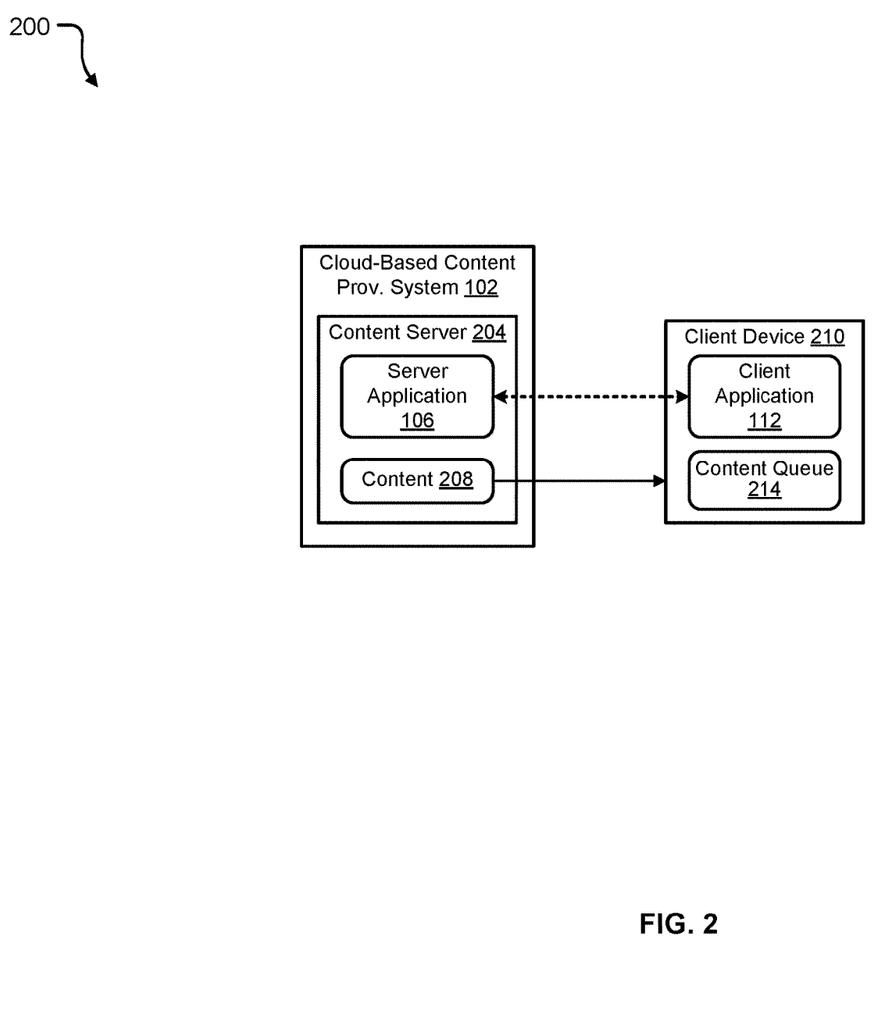
FIG. 2 is a block diagram illustrating a second example operating environment.

FIG. 2 illustrates an example operating environment 200 in which techniques for device/cloud-synergistic queue management may be implemented according aspects of the disclosure. In operating environment 200, a content server 204 delivers content 208 to a client device 210. Content server 204 and client device 210 can be respective ones of content servers 104 and client devices 110 of FIG. 1. Content server 204 executes server application 106, and client device 210 executes client application 112. Content 208 can comprise content of any of the types discussed above in reference to content 108 of FIG. 1.

The contents/structure of a content queue 214 associated with the client device 210 can generally determine the particular content items (e.g., particular audio tracks) that content server 204 includes in the content 208 that it delivers to client device 210 and the order in which those content items are played/presented at client device 210 (e.g., the order in which the particular audio tracks are played). Client application 112 can manage content queue 214 based on user input received at client device 210 (e.g., via a user interface at client device 210). For example, based on user input received at client device 210, client application 112 can add audio tracks to a sequence of audio tracks comprised in content queue 214.

Figure 3:
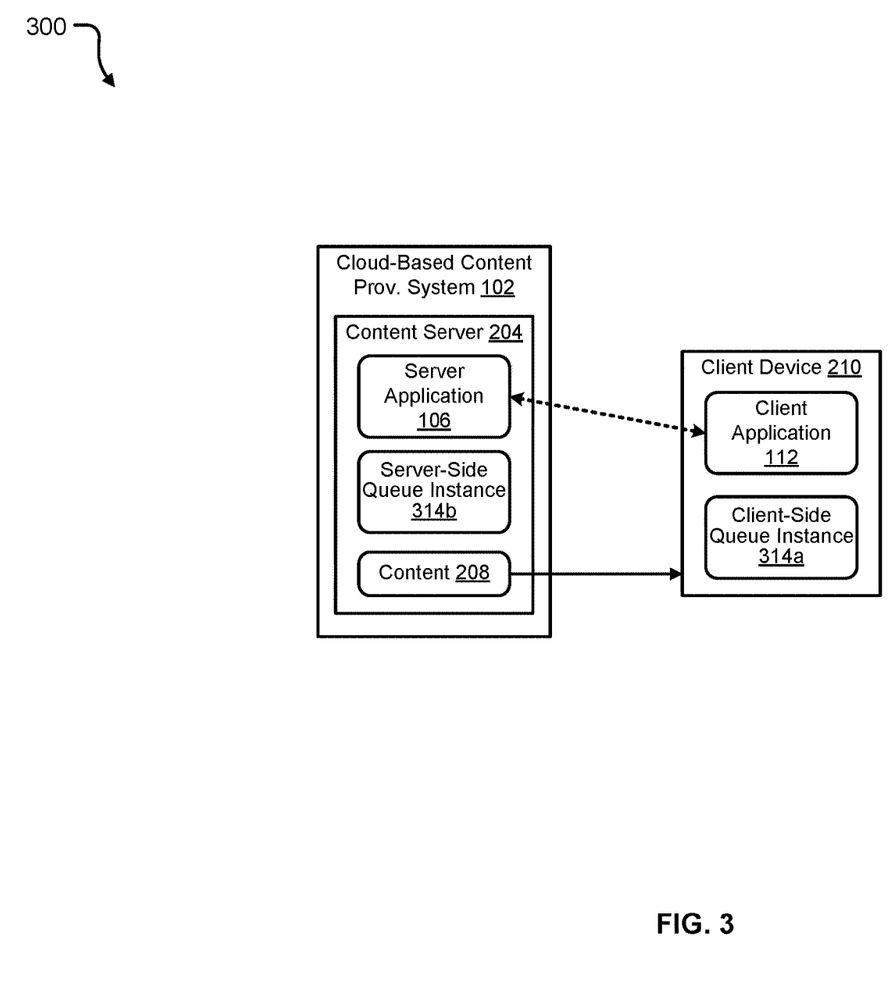
FIG. 3 is a block diagram illustrating a third example operating environment.

FIG. 3 illustrates an example operating environment 300 in which techniques for device/cloud-synergistic queue management may be implemented according aspects of the disclosure. In operating environment 300, client device 210 and content server 204 maintain respective instances of a same content queue (e.g., content queue 214 of FIG. 2) associated with client device 210. At client device 210, client application 112 manages a client-side queue instance 314a of the content queue associated with client device 210. At content server 204, server application 106 manages a server-side queue instance 314b of the content queue associated with client device 210.

According to aspects of the disclosure, at client device 210, client application 112 can make changes to client-side queue instance 314a and sync those changes to the cloud to cause server application 106 to apply the same changes to server-side queue instance 314b. Similarly, at content server 204, server application 106 can make changes to server-side queue instance 314b and sync those changes to client device 210 to cause client application 112 to apply the same changes to client-side queue instance 314a.

Figure 4:
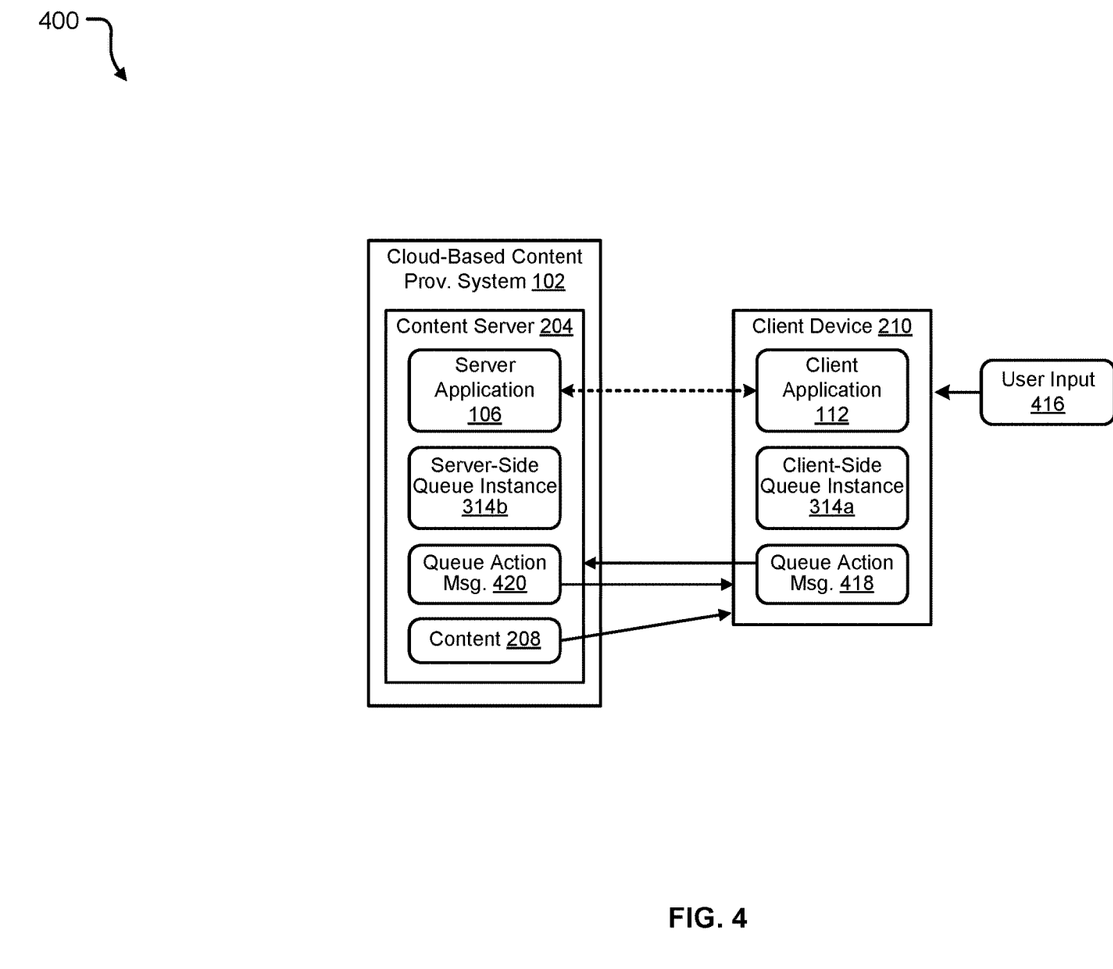
FIG. 4 is a block diagram illustrating a fourth example operating environment.

FIG. 4 illustrates an example operating environment 400 in which techniques for device/cloud-synergistic queue management may be implemented according aspects of the disclosure. In operating environment 400, cloud-based content provision system 102 can determine and perform supplemental actions to improve upon actions that remote client devices (e.g., client device 210) perform with respect to their associated content queues. This can allow the client devices to perform fast local queue modifications that are then refined using data that is not local to the client devices.

In operating environment 400, client device 210 can receive, via a user interface (not shown), user input 416 for client application 112. Based on user input 416, client application 112 can perform a first queue action for the content queue associated with client device 210.

In some implementations the first queue action can comprise a modification of the content queue, and client application 112 can modify client-side queue instance 314a to implement the modification. For instance, the first modification can include reordering the content queue of client device 210. In one example, reordering the content queue can involve moving a particular content item to a different position in the order. In another example, reordering the content queue can involve randomly or pseudo-randomly shuffling the order of content items in the content queue. In yet another example, reordering the content queue can involve changing the order of content items in a deterministic way, such as according to an algorithm.

In some implementations, the first queue action can comprise skipping a content item in the content queue associated with client device 210. In some implementations, the first queue action can comprise associating user feedback with content in the content queue associated with client device 210. For example, the first queue action can comprise setting a "thumbs-up" or "thumbs-down" flag to indicate that a user likes or dislikes a content item in the content queue. In some implementations, the first queue action can comprise changing an associated location of client device 210 (e.g., from one country, region, or metropolitan area to another country, region, or metropolitan area). In some such implementations, the change in associated location may be initiated based on information provided by positioning functionality of client device 210.

To inform content server 204 of the first queue action, client device 210 can send content server 204 a queue action message 418 that indicates the first queue action. In some implementations, the queue action message 418 can be sent in real time to content server 204. In other scenarios, for example, when client device 210 does not have networking connectivity to client server 204 when the fist queue action is performed, the queue action message 418 can be sent at a later time upon client device 210 re-establishing network connectivity to content server 204. In some instances, multiple queue actions may have occurred during the loss of network connectivity. In such situations, multiple queue action messages can be sent to content server 204 upon re-establishing network connectivity.

Content server 204 can identify the first queue action based on queue action message 418, and can apply the first queue action on the server side. If the first queue action comprises a modification of the content queue associated with client device 210, content server 204 can apply the first queue action on the server side by modifying server-side queue instance 314*b* to implement the modification. If the first queue action comprises associating user feedback with content in the content queue, content server 204 can update server-side user feedback information for client device 210 to reflect that association. If the first queue action comprises changing an associated location of client device 210, content server 204 can update server-side location information for client device 210 to reflect that change.

It is worthy of note that in some implementations, the first queue action may involve an event that, while relevant to the content queue of client device 210, does not involve modifying that content queue or changing parameters or metadata associated therewith. In some cases, the first queue action may involve an event occurring outside the scope of—and/or unknown to—client application 112. For instance, the first queue action may be a change in geographic location of client device 210 (e.g., from one metropolitan area to a different metropolitan area), and this change may be detected by positioning functionality of client device 210 that is not exposed/available to client application 112. In such cases, queue action message 418 may represent a message originating from outside of client application 112. In some implementations, notification of the first queue action can be provided to the cloud not by client device 210, but by another entity/source. Continuing with the previous example in which the first queue action is a change in geographic location of client device 210, queue action message 418—indicating the change in geographical location of client device 210—may be sent to content server 204 by a location server that provides content server 204 with location information for the client devices that it serves.

In some implementations, content server 204 can determine a second queue action for the content queue associated with client device 210 based on the first queue action. The second queue action can be a supplemental queue action for the first queue action. As used herein, the term "supplemental queue action" refers to a queue action that is determined based on another queue action, and designed to beneficially refine aspect(s) of content delivery and/or presentation relative to that other queue action.

In some implementations in which the first queue action comprises a modification of the content queue associated with client device 210, the second queue action can be a second modification of the content queue. For instance, if the first queue action comprises reordering the content queue, the second queue action can comprise refining the modified order to eliminate bunching of audio tracks performed by a common artist. In implementations in which the second queue action comprises a second modification of the content queue, server application 106 can further modify server-side queue instance 314*b* to implement the second modification. In some implementations, the second queue action can comprise adjusting a position of insertion of an advertising break within the order (or modified order) of content items in the content queue.

To inform client device 210 of the second queue action, content server 204 can send client device 210 a queue action message 420 that indicates the second queue action. Client device 210 can identify the second queue action based on queue action message 420, and can apply the second queue action on the client side. If the second queue action comprises a modification of the content queue associated with client device 210, client device 210 can apply the second queue action on the client side by modifying client-side queue instance 314*a* to implement the modification.

Figure 5:
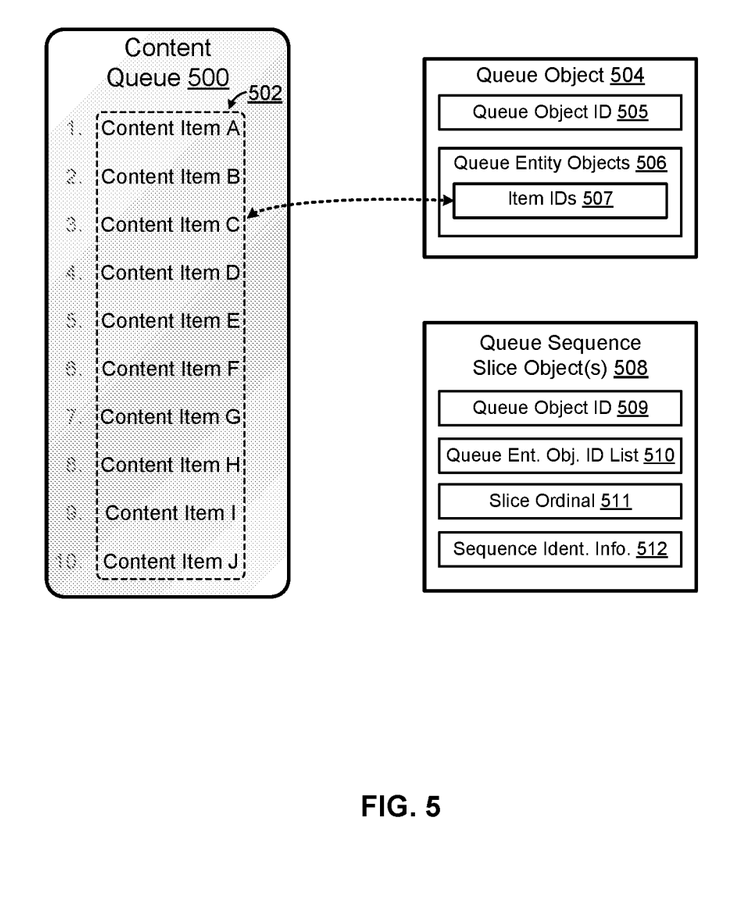
FIG. 5 is a block diagram illustrating an example content queue state.

FIG. 5 illustrates an example content queue state that may be representative of a state of a content queue 500 associated with client device 210 in operating environment 400 of FIG. 4 according to aspects of the disclosure. As used herein, the term "content queue state" refers to the particular content items—and the order of those content items—in a content queue at a particular point in time. According to the example content queue state depicted in FIG. 5, content queue 500 comprises ten content items—content items A to J, which occupy respective positions 1 to 10 according to the depicted content queue state. It is to be appreciated that content queue 500 may contain a greater or lesser number of content items at a given point of time.

A client device (e.g., client device 210 in operating environment 400 of FIG. 4) can understand the content queue state of content queue 500 at a given point in time based on a queue object 504 and one or more queue sequence slice objects 508. Queue object 504 can include a queue object identifier 505 comprising a value that uniquely identifies queue object 504. A correspondence can be established between queue object 504 and the set 502 of content items in content queue 500 according to the content queue state. For each such content item, queue object 504 can "point to" a respective queue entity object 506. Each queue entity object 506 can include an item identifier 507 that uniquely identifies a respective one of the set 502 of content items.

The client device can identify the set 502 of content items by referring to queue object 504 and its associated queue entity objects 506. In order to determine the order of those content items, the client device can refer to the one or more queue sequence slice objects 508, which can collectively specify an order of the content items of set 502, according to the content queue state.

In some cases, a single queue sequence slice object 508 can be used to specify the order of the content items of set 502. In such a case, the client device can identify the content items included in set 502 based on the queue entity objects 506 associated with queue object 504, and can determine the order of those content items (according to the content queue state) based on that single queue sequence slice object 508. In other cases, multiple queue sequence slice objects 508 can be used to specify the order of the content items of set 502. In such a case, each of the multiple queue sequence slice objects 508 can convey a respective portion of the overall order, and the client device can determine the overall order by combining the respective portions conveyed by the multiple queue sequence slice objects 508. According to some implementations, whether a single queue sequence slice object 508 is used or multiple such objects are used can depend on the number of content items in set 502. According to some implementations, for instance, a single queue sequence slice object 508 may be used if the number of content items in set 502 is less than or equal to a threshold number, while multiple queue sequence slice objects 508 may be used if the number of content items in set 502 exceeds that threshold number.

Each queue sequence slice object 508 can include a respective queue object identifier 509, queue entity object identifier list 510, and slice ordinal 511. In each queue sequence slice object 508, the queue object identifier 509 can comprise a value that uniquely identifies queue object 504, and the queue entity object identifier list 510 can comprise an ordered list of queue entity object identifiers, each of which can be associated with a respective one of queue entity objects 506 (and thus, a respective one of the content items of set 502). The client device can understand the order in which the queue entity object identifiers appear in queue entity object identifier list 510 as an indication of the order in which the corresponding content items appear in content queue 500 according to the content queue state. In instances in which multiple queue sequence slice objects 508 are used to convey the overall order for the set 502 of content items according to the content queue state of content queue 500, the respective values of slice ordinal 511 in those multiple queue sequence slice objects 508 can be set to indicate an order in which the conveyed queue entity object identifier lists 510 should be combined in order to determine the overall order.

According to various implementations, multiple sets of queue sequence slice objects 508 can be defined and associated with the same queue object 504 so that multiple possible orderings can be defined/recognized for the same set 502 of content items. In such implementations, respective sequence identifying information 512 in the various queue sequence slice objects 508 can indicate which queue sequence slice sets those queue sequence slice objects 508 belong to. In some implementations, sequence identifying information 512 can include a sequence name and/or a sequence version.

Figure 6:
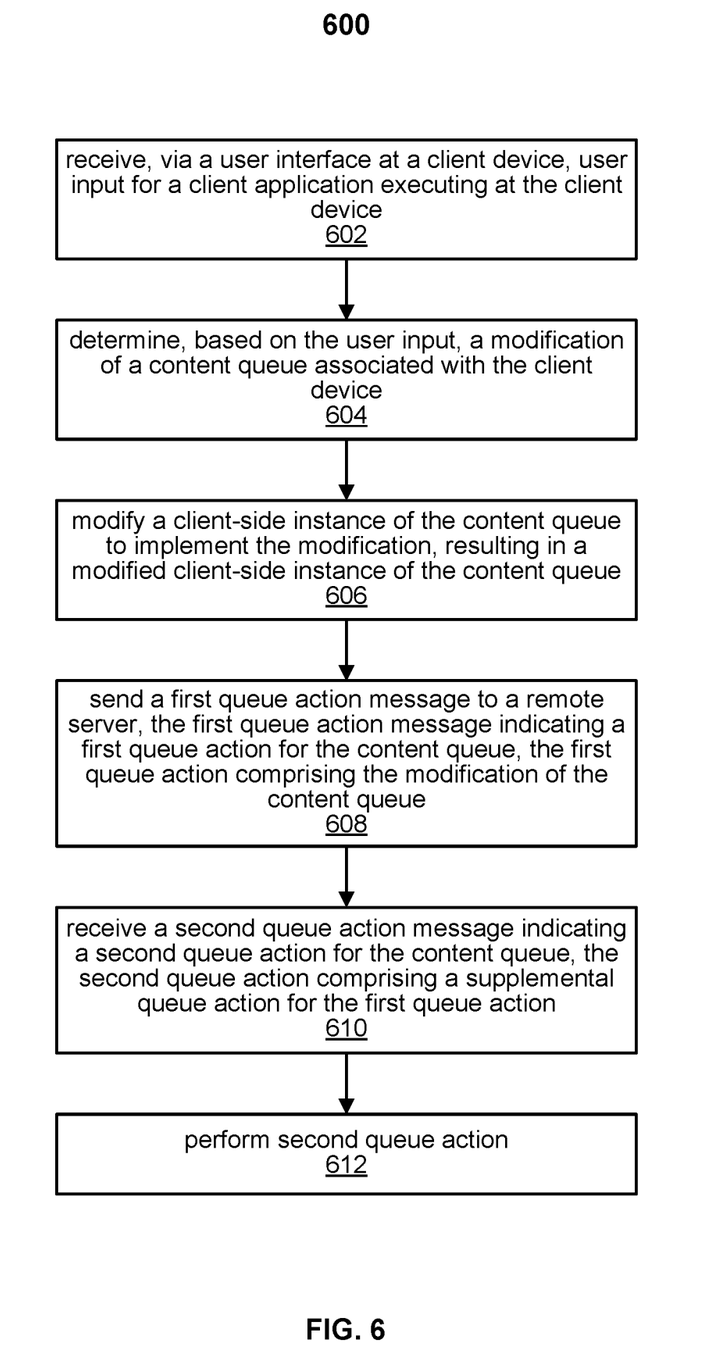
FIG. 6 is a block diagram illustrating a first example process.

FIG. 6 includes a flowchart illustrating an example of a process 600 for device/cloud-synergistic queue management. These methods may be implemented by devices described above, such as for example client device 210.

At step 602, the process 600 includes receiving, via a user interface at a client device, user input for a client application executing at the client device. For example, in operating environment 400 of FIG. 4, client device 210 can receive user input 416 via a user interface of client device 210. At step 604, the process 600 includes determining, based on the user input, a modification of the content queue associated with the client device. For example, in operating environment 400 of FIG. 4, client device 210 can determine a modification of a content queue associated with client device 210. According to some implementations, the modification determined at step 604 can comprise modification of a queue sequence slice object associated with the content queue.

At step 606, the process 600 includes modifying a client-side instance of the content queue to implement the modification, resulting in a modified client-side instance of the content queue. For example, in operating environment 400 of FIG. 4, client device 210 can modify client-side queue instance 314a to implement the modification determined at 604.

At step 608, the process 600 includes sending a first queue action message to a remote server, the first queue action message indicating a first queue action for the content queue, the first queue action comprising the modification of the content queue. For example, in operating environment 400 of FIG. 4, client device 210 can send queue action message 418 to content server 204, and queue action message 418 can indicate a first queue action comprising the modification implemented at 606.

At step 610, the process 600 includes receiving a second queue action message indicating a second queue action for the content queue, the second queue action comprising a supplemental queue action for the first queue action. For example, in operating environment 400 of FIG. 4, client device 210 can receive queue action message 420 from content server 204, queue action message 420 can indicate a second queue action for the content queue associated with client device 210, and the second queue action can comprise a supplemental queue action for the first queue action.

In some implementations, the second queue action can comprise a second modification of the content queue. In some implementations, the first modification can comprise reordering the content queue, resulting in a modified order, and the second modification can comprise refining the modified order. In some implementations, such reordering of the content queue can involve—for example—randomly or pseudo-randomly shuffling the order of content items in the content queue, changing the order of content items in a deterministic way, such as according to an algorithm, or moving a particular content item to a different position in the order. In some implementations, the second queue action can comprise adjusting a position of insertion of an advertising break within an order of content items in the content queue.

At step 612, the process 600 includes performing the second queue action. For example, in operating environment 400 of FIG. 4, client device 210 can perform the second queue action indicated by queue action message 420.

Figure 7:
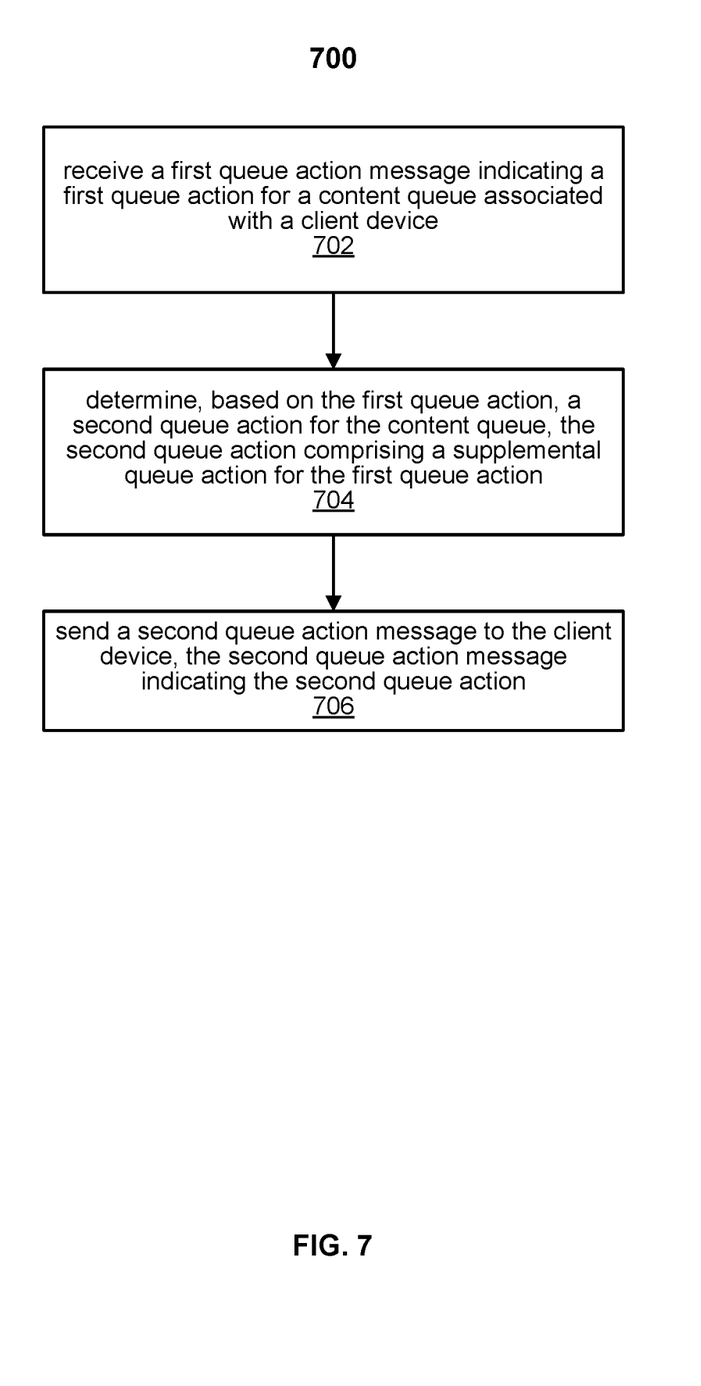
FIG. 7 is a block diagram illustrating a second example process.

FIG. 7 includes a flowchart illustrating an example of a process 600 for device/cloud-synergistic queue management. These methods may be implemented by devices described above, such as for example content server 204.

At step 702, the process 700 includes receiving a first queue action message, where the first queue action message indicates a first queue action for a content queue associated with a client device. For example, in operating environment 400 of FIG. 4, content server 204 can receive queue action message 418 from client device 210, and queue action message 418 can indicate a first queue action for a content queue associated with client device 210.

In some implementations, the first queue action can comprise a first modification of the content queue. Process 700 can include modifying a server-side instance of the content queue to implement the first modification, resulting in a modified server-side instance of the content queue. In some implementations, the first modification of the content queue can comprise modification of a queue sequence slice object associated with the content queue. The first modification can comprise reordering the content queue associated with the client device. Reordering the content queue can involve—for example—randomly or pseudo-randomly shuffling the order of content items in the content queue, changing the order of content items in a deterministic way, such as according to an algorithm, or moving a particular content item to a different position in the order. Other examples of the first queue action can include, for example, skipping a content item in the content queue associated with the client device, associating user feedback with content in the content queue associated with the client device, or changing an associated location of the client device.

At step 704, the process 700 includes determining, based on the first queue action, a second queue action for the content queue, where the second queue action comprises a supplemental queue action for the first queue action. For example, in operating environment 400 of FIG. 4, content server 204 can determine a second queue action for a content queue associated with client device based on a first queue action indicated by queue action message 418.

In some implementations, the second queue action can comprise a second modification of the content queue associated with the client device. Process 700 can include modifying the modified server-side instance of the content queue to implement the second modification, resulting in a second modified server-side instance of the content queue. For example, the first modification can comprise reordering the content queue associated with the client device, resulting in a modified order, and the second modification can comprise refining the modified order. In some implementations, the second queue action can comprise adjusting a position of insertion of an advertisement break within an order of content items in the content queue associated with the client device.

At step 706, the process 700 includes sending a second queue action message to the client device, where the second queue action message indicates the second queue action. For example, in operating environment 400 of FIG. 4, content server 204 can send queue action message 420 to client device 210, and queue action message 420 can indicate the second queue action determined at 704.

Figure 8:
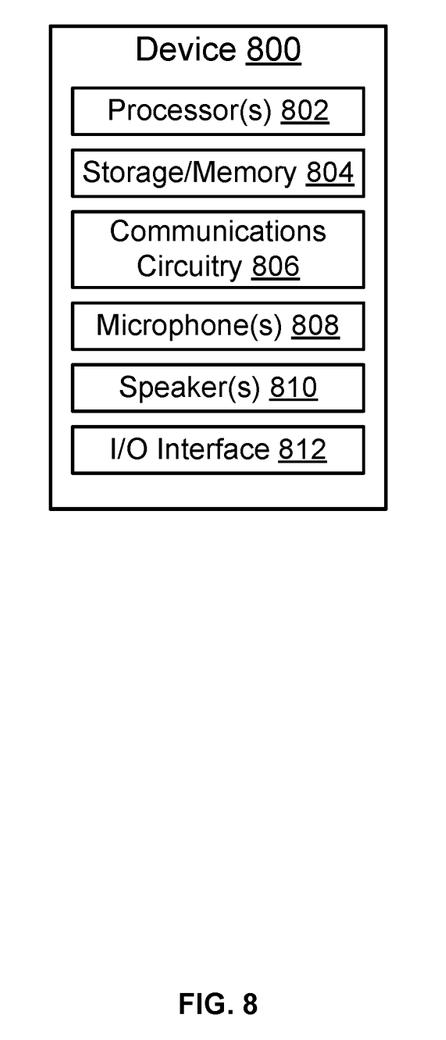
FIG. 8 is a block diagram illustrating an example device.

FIG. 8 illustrates an example device 800 that may implement techniques for device/cloud-synergistic queue management according to aspects of the disclosure. According to various implementations, device 800 may be representative of client device 210. Examples of devices that may be used to implement device 800 according to aspects of the disclosure may include, without limitation, notebook computers, ultrabooks, tablet computers, mobile phones, smart phones, personal data assistants, video gaming consoles, televisions, set top boxes, smart televisions, portable media players, and wearable computers (e.g., smart watches, smart glasses, bracelets, etc.), display screens, displayless devices (e.g., Amazon Echo), other types of display-based devices, smart furniture, smart household devices, smart vehicles, smart transportation devices, and/or smart accessories, among others. According to various implementations, device 800 can be a voice-enabled device that is capable of being activated in response to detecting a specific sound (e.g., a wakeword), recognizing commands (e.g., audio commands, inputs) within captured audio, and performing actions in response to recognized commands.

Device 800 can include one or more processors 802, storage/memory 804, communications circuitry 806, one or more microphones 808 or other audio input devices (e.g., transducers), one or more speakers 810 or other audio output devices, as well as an optional visual input/output ("I/O") interface 812. However, one or more additional components may be included within device 800, and/or one or more components may be omitted. For example, device 800 may include a power supply or a bus connector. As another example, device 800 may not include a visual I/O interface. Furthermore, while multiple instances of one or more components may be included within device 800, for simplicity only one of each component has been shown.

Processor(s) 802 may include any suitable processing circuitry capable of controlling operations and functionality of device 800, as well as facilitating communications between various components within device 800. In some implementations, processor(s) 802 may include a central processing unit ("CPU"), a graphic processing unit ("GPU"), one or more microprocessors, a digital signal processor, or any other type of processor, or any combination thereof. In some implementations, the functionality of processor(s) 802 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 802 may include its own local memory, which may store program modules, program data, and/or one or more operating systems. However, processor(s) 802 may run an operating system ("OS") for device 800, and/or one or more firmware applications, media applications, and/or applications resident thereon.

Storage/memory 804 may include one or more types of storage mediums such as any volatile or non-volatile memory, or any removable or non-removable memory implemented in any suitable manner to store data on device 800. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 804 may be implemented as computer-readable storage media ("CRSM"), which may be any available physical media accessible by processor(s) 802 to execute one or more instructions stored within storage/memory 804. In some implementations, one or more applications (e.g., gaming, music, video, calendars, lists, etc.) may be run by processor(s) 802, and may be stored in memory 804.

Communications circuitry 806 may include any circuitry allowing or enabling device 800 to communicate with one or more devices, servers, and/or systems. For example, communications circuitry 806 may facilitate communications between device 800 and a backend server. Communications circuitry 806 may use any suitable communications protocol. In some implementations, device 800 may include an antenna to facilitate wireless communications with a network using various wireless technologies (e.g., Wi-Fi, Bluetooth, radiofrequency, etc.). In yet another implementation, device 800 may include one or more universal serial bus ("USB") ports, one or more Ethernet or broadband ports, and/or any other type of hardwire access port so that communications circuitry 806 allows device 800 to communicate with one or more communications networks.

Device 800 may also include one or more microphones 808 and/or transducers. Microphone(s) 808 may be any suitable component capable of detecting audio signals. For example, microphone(s) 808 may include one or more sensors for generating electrical signals and circuitry capable of processing the generated electrical signals. In some implementations, microphone(s) 808 may include multiple microphones capable of detecting various frequency levels. As an illustrative example, device 800 may include multiple microphones (e.g., four, seven, ten, etc.) placed at various positions about device 800 to monitor/capture any audio outputted in the environment where device 800 is located. The various microphones 808 may include some microphones optimized for distant sounds, while some microphones may be optimized for sounds occurring within a close range of device 800.

Device 800 may further include one or more speakers 810. Speaker(s) 810 may correspond to any suitable mechanism for outputting audio signals. For example, speaker(s) 810 may include one or more speaker units, transducers, arrays of speakers, and/or arrays of transducers that may be capable of broadcasting audio signals and or audio content to a surrounding area where device 800 may be located. In some implementations, speaker(s) 810 may include headphones or ear buds, which may be wirelessly wired, or hard-wired, to device 800, that may be capable of broadcasting audio. In some implementations, one or more microphones 808 may serve as input devices to receive audio inputs, such as speech. Device 800, may then also include one or more speakers 810 to output audible responses. In this manner, device 800 may function solely through speech or audio, without the use or need for any input mechanisms or displays.

Device 800 can include I/O interface 812. The input portion of I/O interface 812 may correspond to any suitable mechanism for receiving inputs from a user of device 800. For example, a camera, keyboard, mouse, joystick, or external controller may be used as an input mechanism for I/O interface 812. The output portion of I/O interface 812 may correspond to any suitable mechanism for generating outputs from device 800. For example, one or more displays may be used as an output mechanism for I/O interface 812. As another example, one or more lights, light emitting diodes ("LEDs"), or other visual indicator(s) may be used to output signals via I/O interface 812 of device 800. In some implementations, one or more vibrating mechanisms or other haptic features may be included with I/O interface 812 to provide a haptic response to a user from device 800. Persons of ordinary skill in the art will recognize that, in some implementations, one or more features of I/O interface 812 may be included in a purely voice-enabled version of device 800. For example, one or more LED lights may be included on device 800 such that, when microphone(s) 808 receive audio from a user, the one or more LED lights become illuminated signifying that audio has been received by device 800. In some implementations, I/O interface 812 may include a display screen and/or touch screen, which may be any size and/or shape and may be located at any portion of device 800. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some implementations, correspond to a display screen including capacitive sensing panels capable of recognizing touch inputs thereon.

Figure 9:
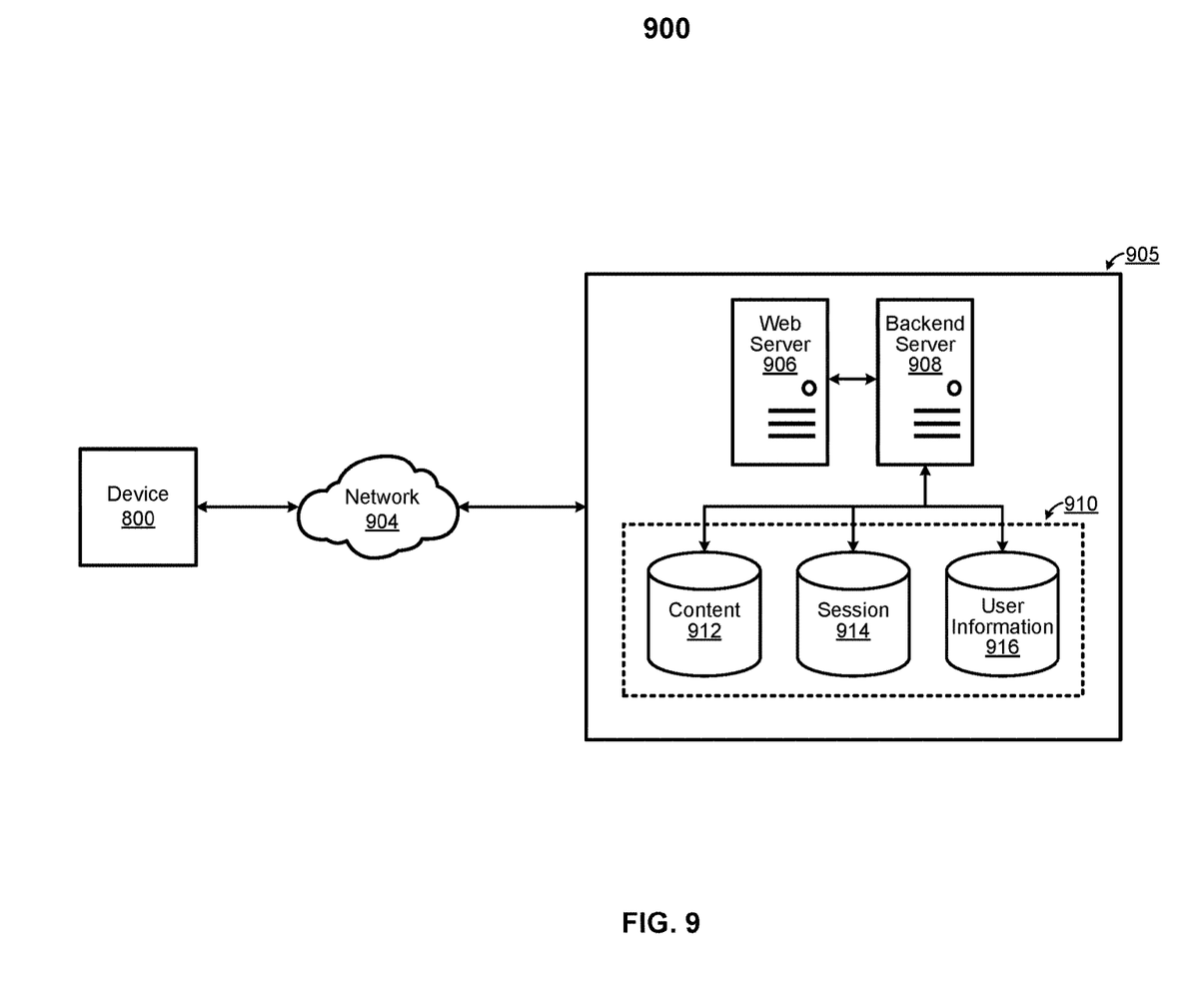
FIG. 9 is a block diagram illustrating an example system.

FIG. 9 illustrates an example system 900 in which techniques for device/cloud-synergistic queue management may be implemented according aspects of the disclosure. System 900 includes device 800, which can include any appropriate device operable to send and receive requests, messages or information to/from entities of a server-side infrastructure 905 via a network 904, and convey information back to appropriate device(s). The network 904 can include any appropriate network, including a telephone network provided by a telecommunication operator, an intranet, the Internet, a cellular network, a local area network, wireless network, or any other such network or combination thereof. Communication over the network 904 can be enabled via wired or wireless connections and combinations thereof.

FIG. 9 depicts a web-based implementation, according to which network 904 can include the Internet and server-side infrastructure 905 can include a web server 906. In such a web-based implementation, web server 906 can receive requests, and serve content in response to those requests, via the Internet. It is to be appreciated that according to other implementations, an alternative device serving a similar purpose could be used, and/or network 904 can be another type of network, and communications between device 800 and entities of server-side infrastructure 905 may not be conveyed via the Internet.

Server-side infrastructure 905 can include at least one backend server 908 and a data store 910. It should be understood that there can be several backend servers 908, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The backend server 908 can include any appropriate hardware and software for integrating with the data store 910 as needed to execute aspects of one or more applications for the client device and handling a majority of the data access and business logic for an application. Backend server 908 (or/and another server, such as an application server) can provide access control services in cooperation with the data store 910, analyze audio data and other data, and generate content such as text, graphics, audio and/or video to be transferred to device 800. Such content may be served by the web server 906 in the form of HTML, XML or another appropriate structured language in this example. The handling of requests and responses, as well as the delivery of content between device 800 and backend server 908, can be handled by the Web server 906.

Data store 910 can include several separate data tables, databases or other data storage mechanisms and media for storing data relating to a particular aspect. For instance, in the depicted example, data store 910 includes mechanisms for storing content (e.g., production data) 912 and user information 916, which can be used to serve content for the production side. Data store 910 is also shown to include a mechanism for storing log or session data 914. It should be understood that there can be other information that may need to be stored in the data store 910, such as page image information and access rights information, which can be stored in any of the above listed mechanisms as appropriate or in additional mechanisms in the data store 910. The data store 910 is operable, through logic associated therewith, to receive instructions from the backend server 908 and obtain, update or otherwise process data in response thereto. In one such example, device 800 can receive a request to refine the playback of media content, such as music, news, audio books, audio broadcasts, and other such content. In this case, data store 910 might access the user information to verify the identity of a user and access a media service to determine media content the user is associated with. The user's speech can be analyzed and used to generate an updated active play queue or initiate the playback of media content.

Each server of server-side infrastructure 905 typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein. According to some implementations, server-side infrastructure 905 can reside in a distributed computing environment utilizing several computer systems and components that are interconnected via communication links, using one or more computer networks or direct connections. It will be appreciated by those of ordinary skill in the art that such system 900 could operate equally well using a server-side infrastructure 905 having fewer or a greater number of components than are illustrated in FIG. 9. Thus, the depiction of the system 9 in FIG. 9 should be taken as being illustrative in nature and not limiting to the scope of the disclosure.

The various implementations can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Various implementations utilize networks that would be familiar to those skilled in the art for supporting communications using any of a variety of commercially-available protocols, such as TCP/IP, OSI, FTP, UPnP, NFS, CIFS and AppleTalk®. The network can be, for example, a local area network, a wide-area network, a virtual private network, the Internet, an intranet, an extranet, a public switched telephone network, an infrared network, a wireless network and any combination thereof. In implementations utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of implementations, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display screen or keypad, microphone, camera, etc.) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc. Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, sending and retrieving computer-readable information. The system and various devices also typically will include a number of software applications, modules, services or other elements located within at least one working memory device, including an operating system and application programs such as a client application or Web browser. It should be appreciated that alternate implementations may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various implementations.

The modules described herein may be software modules, hardware modules or a suitable combination thereof If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for managing a content queue associated with a client device, the method comprising:
   receiving, via a user interface at the client device, user input for a client application executing at the client device;
   determining, based on the user input, a first modification of the content queue associated with the client device, the content queue represented using a set of queue sequence slice objects, and the first modification comprising modification of a queue sequence slice object associated with the content queue,
   wherein the queue sequence slice object includes:
      a queue object identifier of the content queue;
      a queue entity object identifier list containing identifiers of a subset of content in the content queue;
      a slice ordinal indicating which portion of an overall order of the content queue the queue sequence slice object represents; and
      a sequence version indicating which of multiple different orderings of content in the content queue that the queue sequence slice object belongs to;
   modifying a client-side instance of the content queue to implement the first modification, resulting in a modified client-side instance of the content queue;
   sending a first queue action message to a remote server, the first queue action message indicating a first queue action for the content queue, the first queue action comprising the first modification;
   receiving a second queue action message indicating a second queue action for the content queue, the second queue action comprising a supplemental queue action for the first queue action; and
   performing the second queue action.

2. The method of claim 1, wherein the second queue action comprises a second modification of the content queue associated with the client device.

3. The method of claim 2, wherein the first modification comprises reordering the content queue associated with the client device, resulting in a modified order, wherein the second modification comprises refining the modified order.

4. The method of claim 1, wherein the second queue action comprises adjusting a position of insertion of an advertising break within an order of content items in the content queue associated with the client device.

5. A method for managing a content queue, the method comprising:

receiving, by a server, a first queue action message, the first queue action message indicating a first queue action for a content queue associated with a client device;

determining, based on the first queue action, a second queue action for the content queue, the second queue action comprising a supplemental queue action for the first queue action; and sending a second queue action message to the client device, the second queue action message indicating the second queue action to modify the content queue at the client device, wherein the content queue is represented using a set of queue sequence slice objects, and wherein each of the queue sequence slice objects includes:

a queue object identifier of the content queue;

a queue entity object identifier list containing identifiers of a subset of content in the content queue;

a slice ordinal indicating which portion of an overall order of the content queue the corresponding queue sequence slice object represents; and a sequence version indicating which of multiple different orderings of content in the content queue that the queue sequence slice object belongs to.

6. The method of claim 5, wherein the first queue action comprises a first modification of the content queue associated with the client device, the method comprising modifying a server-side instance of the content queue to implement the first modification, resulting in a modified server-side instance of the content queue.

7. The method of claim 6, wherein the first modification of the content queue comprises modification of a queue sequence slice object associated with the content queue.

8. The method of claim 6, wherein the second queue action comprises a second modification of the content queue associated with the client device, the method comprising modifying the modified server-side instance of the content queue to implement the second modification, resulting in a second modified server-side instance of the content queue.

9. The method of claim 8, wherein the first modification comprises reordering the content queue associated with the client device, resulting in a modified order, wherein the second modification comprises refining the modified order.

10. The method of claim 5, wherein the first queue action comprises skipping a content item in the content queue associated with the client device.

11. The method of claim 5, wherein the second queue action comprises adjusting a position of insertion of an advertising break within an order of content items in the content queue associated with the client device.

12. The method of claim 5, wherein the first queue action comprises associating user feedback with content in the content queue associated with the client device.

13. The method of claim 5, wherein the first queue action comprises changing an associated location of the client device.

14. A non-transitory computer-readable medium having stored therein instructions that, when executed by one or more processors, cause the one or more processors to:

receive a first queue action message, the first queue action message indicating a first queue action for a content queue associated with a client device;

determine, based on the first queue action, a second queue action for the content queue, the second queue action comprising a supplemental queue action for the first queue action; and send a second queue action message to the client device, the second queue action message indicating the second queue action to modify the content queue at the client device, wherein the content queue is represented using a set of queue sequence slice objects, and wherein each of the queue sequence slice objects includes:

a queue object identifier of the content queue;

a queue entity object identifier list containing identifiers of a subset of content in the content queue;

a slice ordinal indicating which portion of an overall order of the content queue the corresponding queue sequence slice object represents; and a sequence version indicating which of multiple different orderings of content in the content queue that the queue sequence slice object belongs to.

15. The non-transitory computer-readable medium of claim 14, wherein the first queue action comprises a first modification of the content queue associated with the client device, the non-transitory computer-readable medium further having stored therein instructions that, when executed by the one or more processors, cause the one or more processors to modify a server-side instance of the content queue to implement the first modification, resulting in a modified server-side instance of the content queue.

16. The non-transitory computer-readable medium of claim 15, wherein the first modification of the content queue comprises modification of a queue sequence slice object associated with the content queue.

17. The non-transitory computer-readable medium of claim 15, wherein the second queue action comprises a second modification of the content queue associated with the client device, the non-transitory computer-readable medium further having stored therein instructions that, when executed by the one or more processors, cause the one or more processors to modify the modified server-side instance of the content queue to implement the second modification, resulting in a second modified server-side instance of the content queue.

18. The non-transitory computer-readable medium of claim 17, wherein the first modification comprises reordering the content queue associated with the client device, resulting in a modified order, wherein the second modification comprises refining the modified order.

19. The non-transitory computer-readable medium of claim 14, wherein the first queue action comprises skipping a content item in the content queue associated with the client device.

20. The non-transitory computer-readable medium of claim 14, wherein the second queue action comprises adjusting a position of insertion of an advertising break within an order of content items in the content queue associated with the client device.

* * * * *